March 5, 1935.   J. A. LAMONT   1,993,104
TRUCK
Filed July 24, 1930   4 Sheets-Sheet 2

Inventor
John A. Lamont,
By Dickinson, Huxley, Byron & Knight
Attys.

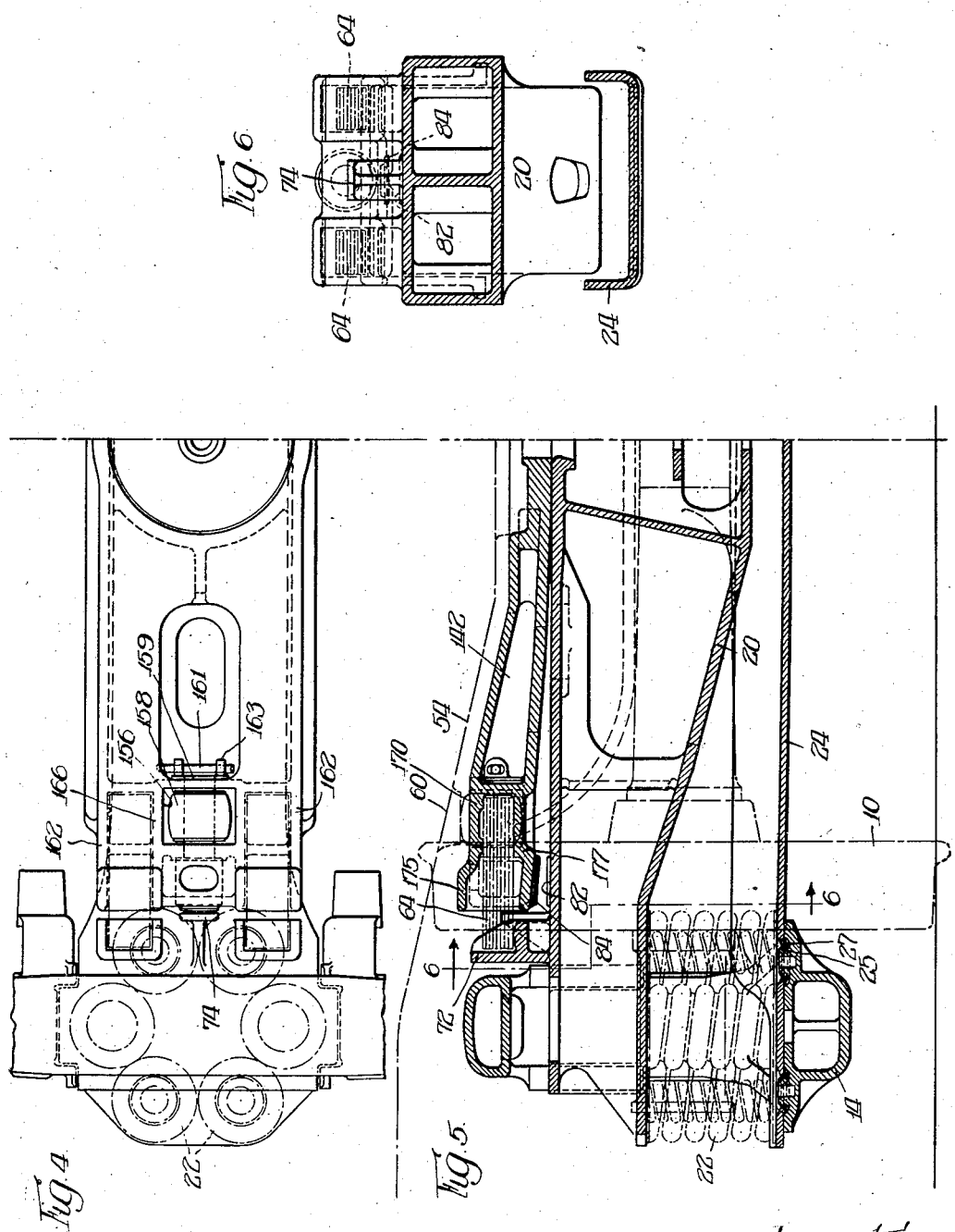

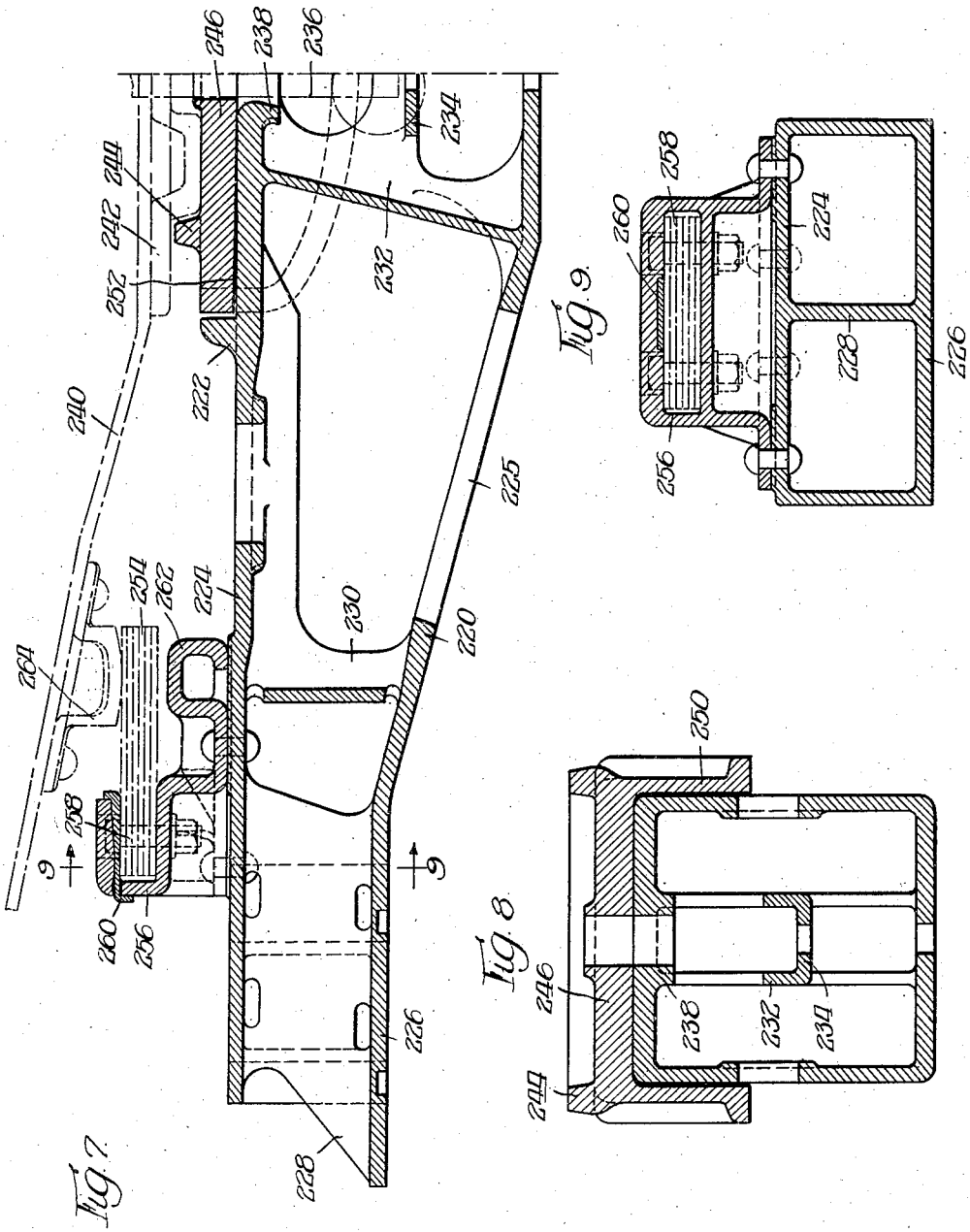

Patented Mar. 5, 1935

1,993,104

UNITED STATES PATENT OFFICE 1,993,104

TRUCK

John A. Lamont, Chicago, Ill., assignor to American Steel Foundries, Chicago, Ill., a corporation of New Jersey Application July 24, 1930, Serial No. 470,358

34 Claims. (Cl. 105—200)

This invention pertains to truck construction and contemplates a structure wherein means is provided for preventing excessive side roll of the vehicle.

It is an object of this invention to provide means adapted for use with a railway vehicle for preventing excessive side roll of the vehicle.

Another object is to provide stabilizing means for a vehicle which is also adapted to provide additional shock receiving members for a truck.

Still another object of the invention is to provide a car truck having means interposed between the body and truck bolster to prevent the usual side roll of the car body due to transmission of the action of the springs and indirectly to the wheels in passing over the usual irregularities in the track.

A further object is to provide a truck construction for high speed freight or passenger service which fulfills all requirements of manufacture and service.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 4 is a fragmentary top plan view of a modified form of truck construction embodying the invention;

Figure 5 is a fragmentary transverse sectional elevation taken substantially at the center line of the bolster shown in Figure 4;

Figure 6 is a transverse sectional elevation taken substantially in the plane as indicated by the line 6—6 of Figure 5;

Figure 7 is a fragmentary transverse sectional elevation taken substantially at the center line of a bolster construction and showing a further modified form of the invention;

Figure 8 is a transverse sectional elevation taken substantially at the center line of the bolster and showing the cooperative relation between the rocking device and the bolster; and Figure 9 is a transverse sectional elevation taken substantially in the plane as indicated by the line 9—9 of Figure 7.

Although only a portion of the truck constructions is shown, it will be understood that the description applies equally well to the opposing similar constructions.

Figure 1:
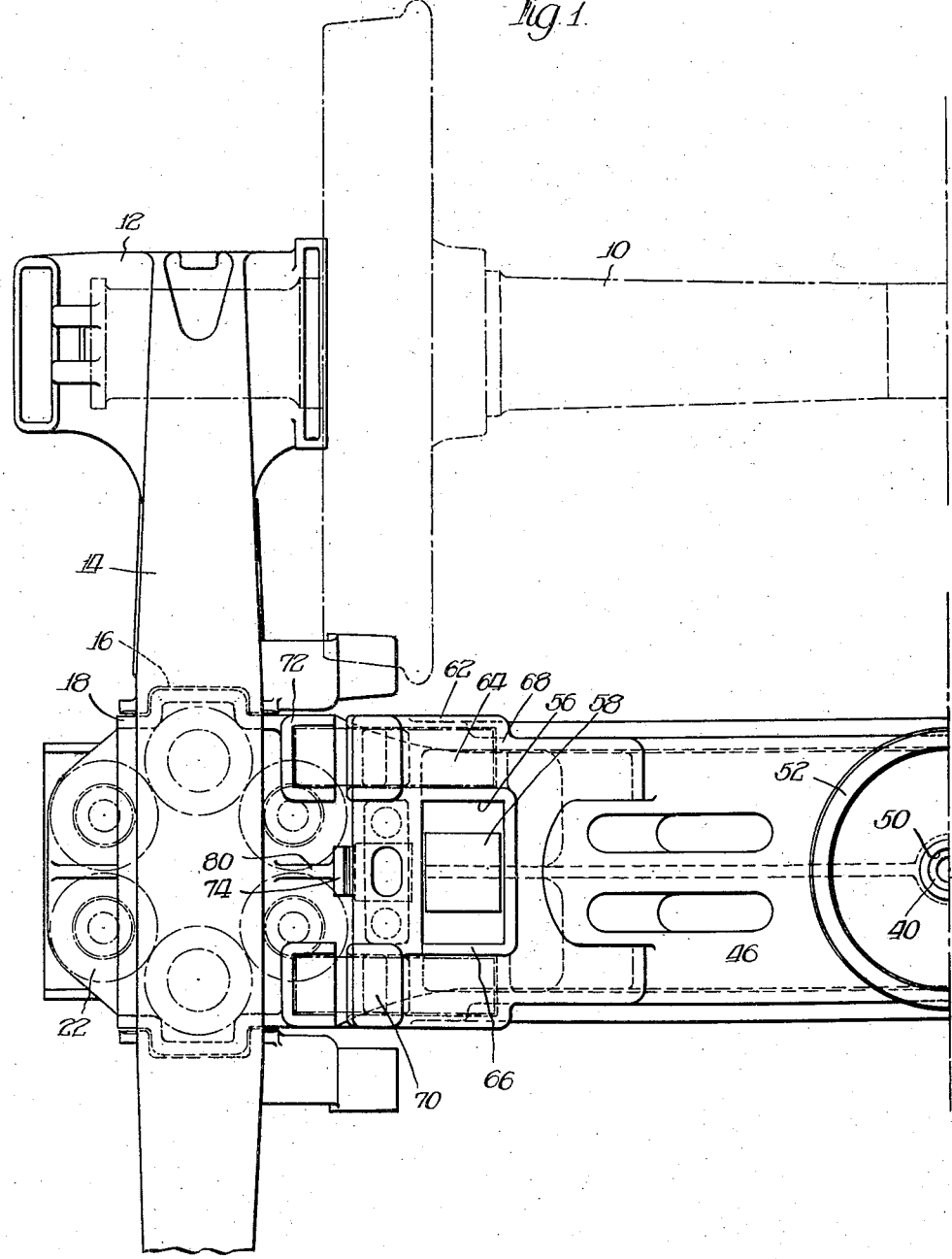
Figure 1 is a fragmentary top plan view showing a portion of a truck construction embodying the invention.
Figure 2:
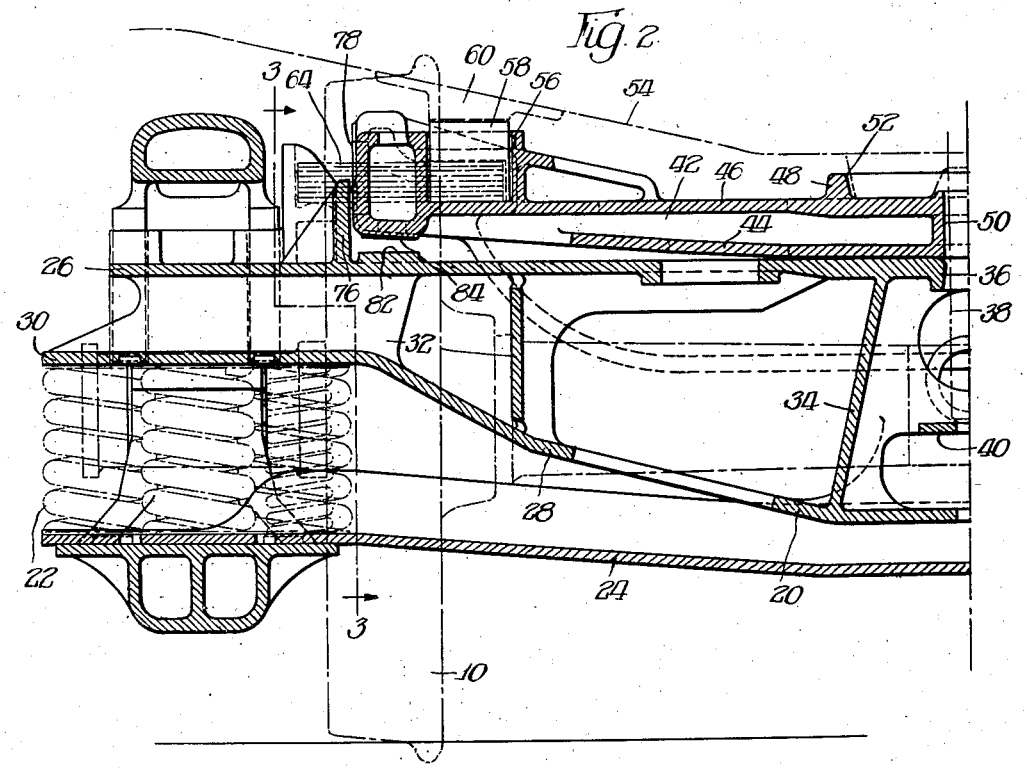
Figure 2 is a fragmentary transverse sectional elevation taken substantially at the center line of the bolster shown in Figure 1.
Figure 3:
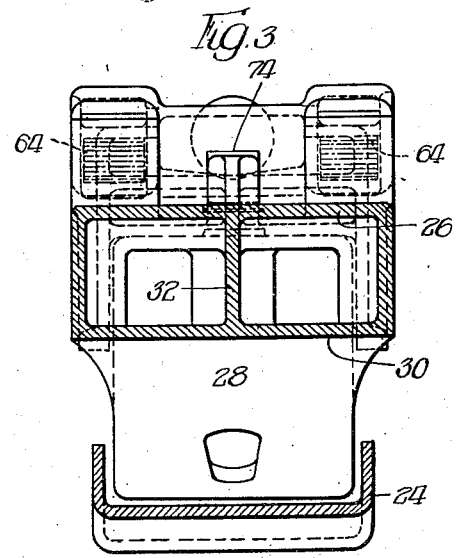
Figure 3 is a transverse sectional elevation taken substantially in the plane as indicated by the line 3—3 of Figure 2.

Referring first of all more particularly to the construction shown in Figures 1 to 3 inclusive, the wheel and axle assemblies 10, shown of the friction type, but which of course may be of the ASF anti-friction type, are disposed in cooperative relation with the journal box 12 cast integral with the side frame 14. The side frame is of the usual construction including spaced compression and tension members and column guides 16 adapted to have cooperative relation with columns 18 provided on the bolster 20, the bolster being resiliently positioned by means of the nested coil springs 22, the side frames being spaced and joined by means of the spring plank 24.

The bolster includes the upper substantially flat compression member 26 and the lower upwardly extending tension member 28, the lower member being provided with the outwardly extending spring seat portion 30. The bolster is reinforced by the vertical webs 32 and is provided with the upwardly and inwardly extending spaced strut members 34 disposed adjacent the king pin opening defined by the flanges 36 which extend downwardly and flare outwardly, the opening thus defined being adapted to receive the king pin indicated at 38. The king pin is supported in the usual manner and terminates adjacent the web 40 disposed integral with and joining the spaced reinforcing members 34, said web 40 providing an emergency support should the usual support fail. It will be noticed that the bolster is not provided with a center bearing cast integral therewith.

The bolster stabilizing device 42, which is essentially a beam, is provided with a lower curved surface 44 and an upper substantially flat surface 46 spaced therefrom and provided with the center bearing 48 having a king pin opening 50 adapted to register with the king pin opening in the bolster, the center bearing being adapted to accommodate the car body center bearing 52 provided on the body bolster 54. Though the truck bolster is shown as having a flat upper surface, this surface may be slightly curved to a radius somewhat greater than that of the lower surface 44 of the bolster stabilizing member. It will be noted that when side sway of the car body occurs the king pin will rock with the car body and the stabilizing device, and this pendulum movement will be permitted by the flaring flanges 36 of the truck bolster.

The stabilizing device is provided with integral roller bearing pockets 56 in which the rollers 58 are shown as free, but are preferably pivoted, said rollers being adapted to insure free swiveling action and to have cooperative engagement with the body bolster side bearing 60 when rolling of the car body occurs, there being only sufficient clearance between the rollers and the body side bearings to insure a center plate bearing. Spring pockets 62 are provided on both sides of the pockets 56 for accommodating the leaf spring assemblies or snubbing devices 64, said pockets being defined by the side walls 66 of the pockets 56, end walls 68, the top wall 46 of the rocking member, and the transverse strap 70 disposed adjacent the outer end of said pocket.

The leaf spring assemblies 64 extend outwardly and engage in pockets formed in the spaced bearings 72, said pockets being substantially L-shaped in vertical section, as shown in Figure 2, and substantially U-shaped in top plan, as shown in Figure 1 wherein the pockets substantially embrace the spring assemblies. Guide members 74 are cast integral with the top of the bolster and are disposed between the bearings 72, said guides including an upwardly extending guide portion 76 adapted to have cooperative engagement with a corresponding guide surface 78 formed on the end of the rocking member, the guide 76 being provided with the integral bracket 80 formed integral with the top of the bolster, the bolster also being provided with the boss or bearing 82 adapted to receive the corresponding boss or bearing 84 provided on the rocking member, the clearance between said bosses being less than the safe bending limit of the spring plates so that said spring assemblies will not be stressed beyond their elastic limit.

The radius of the curved surface of the stabilizing member, in this and succeeding modifications, lying outside of the center of gravity of the car body, any tendency of the stabilizing member to roll on the bolster or for the car body to rock must result in lifting the center of gravity of the load which is resisted by an inertia of such force that instead of any movement or action of the springs being transmitted to the car body on movement due to weaving of the truck structure adjusting itself to unevenness of the track, it is limited to the truck bolster, causing an up and down movement of the ends of the bolster about the transverse center line of the bolster.

By way of illustration, when the truck passes over any unevenness of the track, any one of the four wheels of the truck may rise or dip at an elevation or depression. This will cause a compression or release of the coil springs 22. When this occurs in the present construction, the bolster stabilizer 42 prevents rocking between the center bearings 48 and 52, and all relative movement between the bolster stabilizer 42 and the bolster is limited to the rolling action resisted by the snubber springs 64. It is therefore readily apparent that with the present and succeeding constructions a full center plate bearing is provided between the car body and stabilizing device providing free swiveling action of the body at all times, any slight side sway of the body by this construction being directly transmitted through the arcuate bolster cooperating surface of the stabilizer to the bolster.

The capacity of the snubbing spring plates may therefore be of comparatively low capacity as they have a snubbing action only at low speeds. Beyond certain critical speeds they may be regarded as increasing the effective compressive range of the coil springs; that is, the vertical range of movement of the ends of the truck bolster is increased by an amount slightly greater than the clearance between the cooperative bearings 82 and 84 formed on the bolster and stabilizing member respectively. This may be regarded as the increased travel capacity of the coil springs.

Referring now more particularly to the construction shown in Figures 4 to 6 inclusive, the side frame 14 positions the spring plank 24 by means of cooperative relation between the bosses and apertures 25 and 27 provided on the side frame and spring plank. In this case the spring assemblies 22 serve to resiliently support the bolster 20 which is of the same construction as has already been described. A slightly modified form of stabilizing member 142 is shown wherein there is provided the roller pocket 156 for pivotally containing the roller 158 pivoted on the pin 159 locked in position by means of the rod or cotter 161 retained in the spaced apertured lugs 163. The spring assemblies 64 have cooperative engagement with the pockets and the spaced bearings 72, and are retained in the pockets 162 formed on each side of the roller recess, said pockets being provided with the upper wall 170 contacting the spring assemblies and being outwardly flared as at 175, the lower walls of the pockets being defined by the member 177, the pocket being defined on its sides by means of the walls 162 and 166.

Of course the action of this type is similar to that of the construction above described and shown in Figures 1 to 3 inclusive, the changes being only structural, the parts numbered corresponding to Figures 1 to 3 inclusive being the same as in those figures.

Referring now more particularly to the structure shown in Figures 7 to 9 inclusive, the bolster 220 is provided with the integral lug 222 formed on the upper chord 224 thereof, the lower upwardly extending chord 225 terminating in an outwardly extending spring seat portion 226. The upper and lower chords are joined by vertical reinforcing webs 228—230 and the center reinforcing construction 232, said construction being provided with the auxiliary king pin bearing web 234 adapted to have emergency cooperative relation with the king pin 236. The king pin aperture in the main bearing is provided with depending outwardly flaring flanges 238 for permitting roll of the king pin.

The body bolster 240 is provided with the center plate 242 which is adapted to be received in the center plate portion 244 of the center rocking member or plate 246, said plate and center plate of the body bolster being apertured for the reception of the king pin. It will be seen that the stop lug 222 extends transversely of the truck bolster, the rocking member 246 being provided with depending flanged portions 250 adapted to embrace the truck bolster, the bolster cooperating surface 252 of the rocking member 246 having a radius equal to that as described for the stabilizing devices above described, or being slightly arcuate to permit rolling movement between said member and the bolster.

The snubbing spring assemblies 254 are secured in a housing 256 by means of the vertical bolts 258, said bolts extending into recesses in said housing, securing of the spring assemblies being aided by the wedge member 260. The housing is provided with a bearing 262 located substantially beneath the side bearing 264 which has cooperative engagement with the snubber springs, the clearance between the member 262 and the springs being of course slightly less than the elastic limit of said springs.

The arrangement of the side bearings relative to the snubber plates possesses the advantage that the clearance between the springs and the members 262 is or may be at a greater distance from the center line of the coil springs supporting the bolster than the clearance between the members 82 and 84 in the other forms of the construction shown in Figures 1 to 6 inclusive, and accordingly provides proportionately greater vertical movement of the end of the truck bolster before this clearance is taken up and resilient contact of the side bearings is lost and solid contact effected, which would tend to induce rocking action of the car body.

With the construction shown and described, excessive side roll of the car body is greatly reduced, snubbing of the body roll is provided, and a full center bearing is provided at all times insuring free swiveling action. It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a truck, the combination of side frames, a bolster supported on said side frames, a car body, a bolster stabilizing device on said bolster for support of said car body, and resilient means extending beyond said device for bearing engagement with said bolster.

2. In a truck the combination of a side frame, a bolster resiliently supported on said side frame, a car body, a bolster stabilizing device mounted between said bolster and car body, and a resilient member disposed between said device and said bolster for resiliently supporting said device, said device and said bolster having adjacent pockets for receiving said resilient member.

3. In a truck the combination of a side frame, a bolster resiliently supported on said side frame, a car body, a bolster stabilizing device mounted between said bolster and car body, said bolster and said device being provided with spaced adjacent pockets, resilient members mounted therein for resiliently supporting said device, and a member disposed between a pair of said pockets for limiting relative movement between said bolster and said device.

4. In a truck the combination of a side frame, a bolster supported on said side frame, a car body, cantilevered resilient means disposed between said body and said bolster for supporting said body, and means for limiting the movement of said resilient means.

5. In a truck the combination of a side frame, a bolster supported on said side frame, a car body, resilient means disposed between said body and said bolster and having a free end for supporting said body, and means for limiting relative movement between said body and said bolster, said last-named means being normally spaced from the free end of said resilient means to provide clearance less than the safe bending limit of said resilient member.

6. In a truck the combination of a side frame, a bolster resiliently supported on said side frame, a car body, a bolster stabilizing device mounted between said bolster and car body, and a resilient member disposed between said device and said bolster for resiliently supporting said device, and bearings on said bolster and device adapted to have engagement upon relative movement between said bolster and device, said bearings being normally spaced apart to provide clearance less than the same bending limit of said resilient member.

7. A bolster including spaced members, one of said members having a king pin opening therein, said opening being defined by a flared flange to permit rocking movement of said king pin, and an upstanding stop spaced from said opening.

8. In a truck, the combination of a bolster, and a bolster stabilizing device, said bolster including spaced members, one of said members having a spring bearing disposed thereon, and a spring carried by said device and extending beyond the same for engagement with said bearing.

9. In a truck, the combination of a bolster, and a bolster stabilizing device, said bolster including spaced members, one of said members having a bearing disposed thereon and integral therewith, said bearing being defined by a pocket, and a spring engaging in said pocket and with said device.

10. In a truck, the combination of a bolster, a bolster stabilizing device, said bolster including spaced members, one of said members having spaced spring bearings disposed thereon, a limiting bearing disposed therebetween, and a spring between said bolster and device.

11. A bolster stabilizing device including a body member, a center bearing, said body member including upper and lower members merging into and forming a spring recess, the lower member defining one of the walls of a bearing recess.

12. A bolster stabilizing device including a body member, a center bearing, and a bearing recess spaced from said center bearing, said body member including upper and lower members, said upper member defining one of the walls of a bearing recess and forming a load carrying portion therein.

13. A bolster comprising a spring housing including spaced walls forming a spring pocket adapted to receive a spring, a spring disposed in said pocket, securing means for fastening the spring in said pocket, and a spaced bearing portion removed from said pocket and in alignment therewith and disposed substantially in vertical alignment with said spring and normally spaced therefrom.

14. In a truck construction the combination of a bolster, a car body having a side bearing, a stabilizing device disposed between said body and bolster, means on said bolster for limiting movement of said device, and a housing having spring retaining means thereon, a spring secured by said retaining means and having supporting cooperation with said side bearing, said housing having a portion disposed adjacent said spring and side bearing for limiting movement thereof.

15. In a truck construction the combination of a bolster, a car body having a side bearing, a stabilizing device disposed between said body and bolster, said device having portions embracing said bolster and an arcuate bolster engaging surface, means on said bolster for limiting movement of said device, and a housing having spring retaining means thereon, a spring secured by said retaining means and having supporting cooperation with said side bearing, said housing having a portion disposed adjacent said spring and side bearing for limiting movement thereof.

16. In a truck, the combination of a side frame, a bolster supported on said side frame, a car body, a bolster stabilizing device mounted between said bolster and car body, and a resilient member carried by said device and having a free end overhanging said bolster for engagement therewith.

17. In a truck, the combination of a side frame, a bolster supported on said side frame, a car body, a bolster stabilizing device mounted between said bolster and car body, said device being provided with a pocket, and a resilient member engaging in said pocket and protruding from said device for engagement with said bolster.

18. In a truck, the combination of a side frame, a bolster supported on said side frame, a car body, a bolster stabilizing device mounted between said bolster and car body, said device and bolster being provided with pockets, and a resilient member carried in the pocket of said device and engaging in the pocket of said bolster.

19. In a truck, the combination of a side frame, a bolster supported on said side frame, a car body, a bolster stabilizing device mounted between said bolster and car body, and spaced resilient members carried by said device and extending beyond the same for engagement with said bolster.

20. In a truck, the combination of a side frame, a bolster supported on said side frame, a car body having a center bearing, a rocking member on said bolster having an arcuate portion cooperating with said bolster and having a portion cooperating with said center bearing, and resilient means carried by said bolster and engaging with said body for support thereof.

21. In a truck, the combination of a side frame, a bolster supported on said side frame, a car body, and a cantilevered resilient member between said bolster and body for support of said body.

22. In a truck, the combination of a side frame, a bolster supported on said side frame, a car body, and a cantilever spring carried by said bolster and having a free end for engagement with said body for support thereof.

23. In a truck, the combination of a side frame, a bolster supported on said side frame, a car body, resilient means carried by said bolster and engaging with said body for support thereof, said means including a cantilever spring, and means for limiting the movement of said spring.

24. In a truck, the combination of a side frame, a bolster supported on said side frame, a car body having a bearing, a member on said bolster pivotally receiving said bearing, the bolster cooperating surface of said member being arcuate to provide for rolling movement thereof on said bolster, and a resilient member carried by said bolster and engaging with said body for support thereof.

25. In a truck, the combination of a side frame, a bolster supported on said side frame, a car body having a bearing, a member on said bolster pivotally receiving said bearing, the bolster cooperating surface of said member being arcuate to provide for rolling movement thereof on said bolster, and a resilient member carried by said bolster and having its free end for engagement with said body for support thereof.

26. In a truck, the combination of a side frame, a bolster supported on said side frame, a car body, a rocking member on said bolster providing a bearing for said body, said member having depending spaced arms adjacent the sides of said bolster, and resilient means carried by said bolster and engaging with said body for support thereof.

27. In a truck, the combination of side frames, a bolster supported on said side frames, a car body, a bolster stabilizing device mounted on said bolster for support of said car body, said device having an arcuate bolster cooperating surface, and resilient means extending beyond said device for bearing engagement with said bolster.

28. In a truck, the combination of side frames, a bolster supported on said side frames, a car body, a bolster stabilizing device mounted on said bolster for support of said car body, pockets adjacent said device and having bearing portions, and resilient members extending beyond said device and engaging with said bearing portions.

29. In a truck, the combination of side frames, a bolster supported on said side frames, a car body, a bolster stabilizing device mounted on said bolster for support of said car body, pockets adjacent said device and having bearing portions, resilient members extending beyond said device and engaging with said bearing portions, and means adjacent said pockets for limiting relative movement of translation between said bolster and device.

30. In a truck, the combination of side frames, a bolster supported on said side frames, a car body, a bolster stabilizing device mounted on said bolster for support of said car body, said device, having an arcuate bolster cooperating surface, resilient means extending beyond said device for bearing engagement with said bolster, and bearings on said bolster normally spaced from said device to provide clearance less than the safe bending limit of said resilient means.

31. In a truck, the combination of a side frame, a bolster supported on said side frame, a car body, a member on said bolster providing a bearing for said body, and a cantilevered resilient means between said bolster and body for support of said body.

32. In a truck, the combination of a side frame, a bolster supported on said side frame, a car body, a member on said bolster providing a bearing for said body, the bolster cooperating surface of said member being arcuate to provide for rolling movement thereof on said bolster, and a cantilevered resilient means between said bolster and body for support of said body.

33. In a truck, the combination of a side frame, a bolster supported on said side frame, a car body, a rocking plate member disposed on said bolster providing a bearing for said body and having depending arms embracing said bolster, and resilient means carried by said bolster and engaging with said body for support thereof.

34. A bolster comprising spaced members, one of said members having a king pin opening therein, said opening being defined by a flared flange to permit rocking movement of said king pin, and a web disposed between said members and in opposite relation to said opening.

JOHN A. LAMONT.

CERTIFICATE OF CORRECTION.

Patent No. 1,993,104. March 5, 1935.

JOHN A. LAMONT.

It is hereby certified that error appears in the printed specification of the above numbered patent requiring correction as follows: Page 3, second column, line 13, claim 6, for "same" read safe; and that the said Letters Patent should be read with this correction therein that the same may conform to the record of the case in the Patent Office.

Signed and sealed this 9th day of April, A. D. 1935.

(Seal)

Leslie Frazer
Acting Commissioner of Patents.